*(12)* United States Patent
Chirikov et al.

(10) Patent No.: US 11,245,612 B2
(45) Date of Patent: Feb. 8, 2022

(54) NODE AND A METHOD PERFORMED BY THE NODE OPERABLE IN A MESH COMMUNICATION NETWORK FOR ROUTING A RECEIVED PACKET TOWARDS A DESTINATION

(71) Applicant: Telefonaktiebolaget LM Ericsson (publ), Stockholm (SE)

(72) Inventors: Roman Chirikov, Stockholm (SE); Per Skillermark, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 149 days.

(21) Appl. No.: 16/468,410

(22) PCT Filed: Dec. 23, 2016

(86) PCT No.: PCT/SE2016/051316
§ 371 (c)(1),
(2) Date: Jun. 11, 2019

(87) PCT Pub. No.: WO2018/117924
PCT Pub. Date: Jun. 28, 2018

(65) Prior Publication Data
US 2019/0356573 A1  Nov. 21, 2019

(51) Int. Cl.
*H04L 12/751* (2013.01)
*H04L 12/733* (2013.01)
(Continued)

(52) U.S. Cl.
CPC ............. *H04L 45/02* (2013.01); *H04L 45/20* (2013.01); *H04L 45/32* (2013.01); *H04L 45/745* (2013.01); *H04W 40/246* (2013.01); *H04W 84/18* (2013.01)

(58) Field of Classification Search
CPC ......... H04L 45/02; H04L 45/20; H04L 45/32; H04L 45/745; H04W 40/246; H04W 84/18; Y02D 30/70
See application file for complete search history.

(56) References Cited

U.S. PATENT DOCUMENTS

| 7,729,271 B2 * | 6/2010 | Tsuchiya ............. H04L 63/1425 370/252 |
| 2007/0036163 A1 * | 2/2007 | DiBiasio ............... H04L 47/765 370/395.4 |

(Continued)

FOREIGN PATENT DOCUMENTS

| EP | 1324532 A2 | 7/2003 | |
| WO | WO-2010043265 A1 * | 4/2010 | ............. H04L 45/28 |

OTHER PUBLICATIONS

European Search Report For European Patent Application No. 16924761.6, dated Oct. 15, 2019, 4 pages.
(Continued)

*Primary Examiner* — Ashley Shivers
(74) *Attorney, Agent, or Firm* — Sage Patent Group

(57) ABSTRACT

A node operable in a mesh communication network and a method performed thereby for routing a received packet towards a destination are provided. The method includes receiving a packet addressed to a destination node in the mesh network, the packet including information related to address of source node, last hop address, address of destination node, and a hop counter. The method further includes determining whether the destination address is included in a routing table of the node in the mesh communication network. When the destination address is included in a routing table, the received packet is forwarded according to the routing table; or when the destination address is not included (Continued)

in a routing table, the received packet is flooded by broadcasting it in the mesh communication network.

16 Claims, 12 Drawing Sheets

(51) Int. Cl.
*H04L 12/721* (2013.01)
*H04L 12/741* (2013.01)
*H04W 40/24* (2009.01)
*H04W 84/18* (2009.01)

(56) References Cited

U.S. PATENT DOCUMENTS

| | | |
|---|---|---|
| 2008/0170518 A1 | 7/2008 | Duggi et al. |
| 2009/0080393 A1* | 3/2009 | Takatani ................ H04L 45/00 370/338 |
| 2016/0072663 A1 | 3/2016 | Sreenan et al. |
| 2016/0301539 A1 | 10/2016 | Lindoff et al. |

OTHER PUBLICATIONS

David B Johnson et al., "The Dynamic Source Routing Protocol for Mobile Ad Hoc Networks (DSR)", IETF MANET Working Group, Internet-Draft, Jul. 19, 2004, 117 Pages.

International Search Report and Written Opinion of the International Searching Authority, PCT/SE2016/051316, dated Sep. 1, 2017, 13 pages.

* cited by examiner

Table 1

| Packet type | Forced flooding indication | Carries data | Originated by |
|---|---|---|---|
| Flooded packet (FP) | No | Yes | Source or hop |
| Routed packet (RP) | No | Yes | Source or hop |
| Warning packet (WP) | No | Yes | Source or hop |
| Hello packet (HP) | Yes | Yes | Source |
| Hop-by-hop ACK | No | No | Hop or destination |
| End-to-end ACK | No | Maybe | Destination |

Fig. 2a

| Destination | Next hop | Distance | Counter |
|---|---|---|---|
| Routing table of node 1 | | | |
| 2 | 2 | 0 | 1 |
| 2 | 3 | 3 | 1 |
| Routing table of node 3 | | | |
| 2 | 1 | 1 | 1 |
| 2 | 5 | 2 | 1 |
| Routing table of node 4 | | | |
| 2 | 2 | 0 | 1 |
| 2 | 5 | 3 | 1 |
| Routing table of node 5 | | | |
| 2 | 4 | 1 | 1 |
| 2 | 3 | 2 | 1 |
| Routing table of node 6 | | | |
| 2 | 4 | 1 | 1 |
| 2 | 5 | 2 | 1 |
| Routing table of node 7 | | | |
| 2 | 5 | 2 | 1 |
| 2 | 6 | 2 | 1 |

| Destination | Next hop | Distance | Counter |
|---|---|---|---|
| Routing table of node 1 | | | |
| 2 | 2 | 0 | 1 |
| Routing table of node 3 | | | |
| 2 | 1 | 1 | 1 |
| Routing table of node 4 | | | |
| 2 | 2 | 0 | 1 |
| Routing table of node 5 | | | |
| 2 | 4 | 1 | 1 |
| Routing table of node 6 | | | |
| 2 | 4 | 1 | 1 |
| Routing table of node 7 | | | |
| 2 | 5 | 2 | 1 |

NODE AND A METHOD PERFORMED BY THE NODE OPERABLE IN A MESH COMMUNICATION NETWORK FOR ROUTING A RECEIVED PACKET TOWARDS A DESTINATION

TECHNICAL FIELD

The present disclosure relates to communication networks and in particular to routing in a mesh communication network.

BACKGROUND

Mesh topology does not have one central device (like access point) which manages the network and routes packets between nodes. Nodes (same as "devices") in the mesh network communicate with all neighbours in order to deliver a packet from one node to another. Nodes may retransmit packets from other nodes. Such networks are characterized by simple deployment, flexibility, self-maintenance and extended coverage.

Mesh networks are adopted in several wireless technologies like ZigBee, WirelessHART, ISA 100.11a. Currently the standardisation of mesh in Bluetooth Low Energy is ongoing.

One way of operating of the mesh network is flooding. Nodes broadcast packets to all the nodes they can reach. Upon receiving a packet, the node checks the destination address and should broadcast the packet further if it was not addressed to this node. Flooding requires no knowledge about the mesh network and does not guarantee the delivery of packets.

Another way of operating is routing. Instead of broadcasting, devices can identify a route for a packet through the network and unicast the packet from node to node. This requires knowledge about possible routes in the network. Such knowledge is obtained by routing protocols either in proactive (information is gathered and maintained periodically regardless of traffic) or reactive (the route is being found when a packet needs to be sent) manner.

Flooding mesh networks have a drawback of involving all the nodes in retransmission of every packet. Even if a packet was already delivered, some part of the network might still broadcast it further. This drains (often constrained) power sources of the nodes and generates additional interference to other transmissions.

Routing is a much smarter way, where only necessary nodes retransmit packets. But the network knowledge maintenance produces an overhead of route discovery and update. This also affects the power sources; a delay between network initialisation and first transmitted packet occurs due to route discovery.

SUMMARY

The object is to obviate at least some of the problems outlined above. In particular, it is an object to provide a node and a method performed thereby for routing a received packet towards a destination. These objects and others may be obtained by providing a node and a method performed by a node according to the independent claims attached below.

According to an aspect, a method performed by a node in a mesh communication network for routing a received packet towards a destination is provided. The method comprises receiving a packet addressed to a destination node in the mesh network, the packet comprising information related to address of source node, last hop address, address of destination node, and a hop counter; and determining whether the destination address is comprised in a routing table of the node in the mesh communication network. The method further comprises, when destination address is comprised in a routing table, forwarding the received packet according to the routing table; or when destination address is not comprised in a routing table, flooding the received packet by broadcasting it in the mesh communication network.

According to an aspect, a node operable in a mesh communication network for routing a received packet towards a destination is provided. The node is configured for receiving a packet addressed to a destination node in the mesh network, the packet comprising information related to address of source node, last hop address, address of destination node, and a hop counter; and determining whether the destination address is comprised in a routing table of the node in the mesh communication network. The method further comprises, when destination address is comprised in a routing table, forwarding the received packet according to the routing table; or when destination address is not comprised in a routing table, flooding the received packet by broadcasting it in the mesh communication network.

The node and the method performed thereby have several advantages. One possible advantage is that the node is not required to perform any route discovery or maintenance process. Consequently, overhead caused by any route discovery or maintenance may be avoided. Another possible advantage is that power consumption may be reduced due to among other things reduced overhead. Further unnecessary retransmissions may be avoided and hence may also interference due to such retransmissions be reduced. Yet a further advantage is that low and high intensity traffic flows may be adaptively managed within the mesh network. Low intensity flows may be handled using flooding and while high intensity traffic flows may initially start on flooding mode and switch to routing after an initialisation period.

BRIEF DESCRIPTION OF DRAWINGS

Embodiments will now be described in more detail in relation to the accompanying drawings, in which:

FIG. 2a is an illustration of Table 1 indicating different types of packets.

DETAILED DESCRIPTION

Briefly described, a passive route discovery scheme is disclosed. A mesh communication network may start operating in a flooding way and during the flooding period the network nodes autonomously collect statistics of sources, destinations and last transmitting nodes; statistics that is used to build up routes from sources and destinations. After some period of time, when a sufficient amount of statistics has been collected for a certain source and destination pair, the network starts to handle this traffic flow using routing instead of flooding. When operating in routing mode, routers unicast forwarded packets towards the next node on the way to the destination, rather than broadcasting the packet to all neighbours. For low intensity traffic flows, routing mode might never be entered and all traffic between these source and destination pairs is only handled by means of flooding The suitability of using flooding or routing, respectively, may also depend on the traffic intensity between the source and the destination device. While for low traffic intensities the overhead cost caused by the creation and management of routes in the network may not be compensated for by a more efficient handling of the traffic (payload). For higher traffic intensities, on the other hand, the routing overhead cost may be justified by the fact that the traffic (payload) is handled more efficiently. Currently available solutions do not inherently support an adaptive handling of traffic flows with different intensities.

Various exemplifying embodiments of a method performed by a node in a mesh communication network for routing a received packet towards a destination will now be described with reference to FIGS. 1a-1e.

Figure 1A:
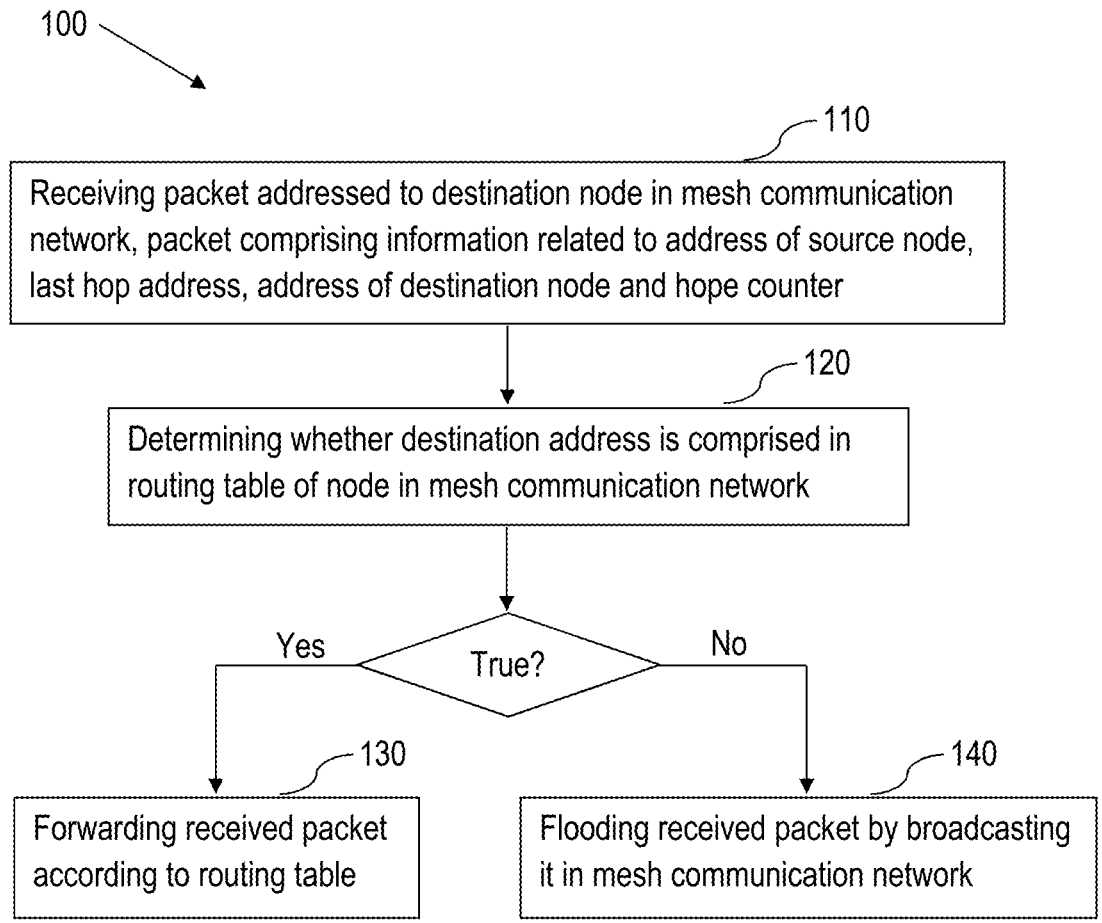
FIG. 1a is a flowchart of a method performed by a node operable in a mesh communication network for routing a received packet towards a destination, according to an exemplifying embodiment.

FIG. 1a illustrates the method 100 comprising receiving 110 a packet addressed to a destination node in the mesh network, the packet comprising information related to address of source node, last hop address, address of destination node, and a hop counter; and determining 120 whether the destination address is comprised in a routing table of the node in the mesh communication network. The method further comprises, when destination address is comprised in a routing table, forwarding 130 the received packet according to the routing table; or when destination address is not comprised in a routing table, flooding 140 the received packet by broadcasting it in the mesh communication network.

When the node receives the packet, the node checks the destination of the packet. The packet comprises information about the node that sent the packet, i.e. source address and the node that is the recipient of the packet, i.e. the destination address of the destination node. The addresses depend on the type of network, or the protocol (of a network layer) used between the nodes to send/transmit and receive packets. Non-limiting examples of addresses are IP address, MAC address, Ethernet address, Bluetooth address etc. The packet also comprises the hop counter. The hop counter is incremented for each node forwarding the packet. The hop counter may be implemented in various ways. One exemplifying implementation, which is used in this enclosure, is that the source node sets the counter to zero, wherein each intermediate node increases the counter when receiving and forwarding the packet. For example, the packet is sent from node A to node G. Node A is the source and hence its address is comprised in the packet. G is the destination node (recipient) and hence its address is also comprised in the packet. Assume in this illustrative example that the packet will be sent from node A to node B, from node B to node C, etc. and finally from node F to node G. That is A→B→C→D→E→F→G. It is pointed out that this is a simplified and illustrative example only. The source node A sets the hop counter to zero and transmits it to B. B increases the hop counter to 1 and transmits the packet to C. C receives the packet, increases the hop counter to 2 and transmits the packet to D and so on. Consequently, when G receives the packet, F will be last hop address and the hop counter will be five. In an alternative implementation, the source node A may set the counter to one instead of zero, and if so the hop counter will have the value of six when received by node G.

When the node receives the packet, it looks at the destination address and looks in its routing table, i.e. the routing table of the node. Either the routing table has an entry for the destination address or no entry for the destination address exists.

If the routing table of the node has an entry for the destination address, the node may forward 130 the received packet according to the routing table. Reverting to the simplified and illustrative example above, assume that the node in question is node C. Node C thus reads the destination address and checks its routing table. If destination address G is in the routing table, the routing table tells node C to forward the packet to node D in order to reach its destination.

However, if there is no entry in the routing table for the destination address, the node cannot know which node to send the packet to in order for the packet to reach its destination node. Consequently, the node floods 140 the received packet by broadcasting it in the mesh communication network. By flooding/broadcasting the packet, the node transmits the packet to all the nodes it is within single-hop communication range. Again reverting to the example above, assume the node in question is node C and that node C is within single-hop communication range node B and node D, but also to node H and node Q. Then node C will forward the packet to nodes B, D, H and Q by flooding/broadcasting the packet.

The method performed by the node operable in the mesh communication network has several advantages. One possible advantage is that the node is not required to perform any route discovery or maintenance process. Consequently, overhead caused by any route discovery or maintenance may be avoided. Another possible advantage is that power consumption may be reduced due to among other things reduced overhead. Further unnecessary retransmissions may be avoided and hence may also interference due to such retransmissions be reduced. Yet a further advantage is that low and high intensity traffic flows may be adaptively managed within the mesh network. Low intensity flows may be handled using flooding and while high intensity traffic flows may initially start on flooding mode and switch to routing after an initialisation period.

Figure 1B:
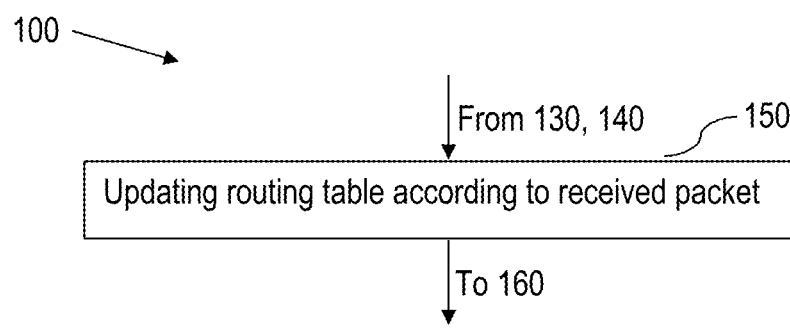
FIG. 1b is a flowchart of a method performed by a node operable in a mesh communication network for routing a received packet towards a destination, according to yet an exemplifying embodiment.

The method may further comprise, as illustrated in FIG. 1b, updating 150 the routing table according to the received packet.

The mesh communication network may be changing dynamically, wherein new routes be become available, old routes may disappear. The received packet comprises information relating to address of source node, last hop address, address of destination node, and a hop counter as described above.

Every time a packet is received, the node may update the routing table accordingly. As will be explained in more detail below, the node may read the source address of the packet. Depending on whether the routing table of the node comprises an entry or not for that source node, the routing table may be updated accordingly. It may be that the routing table comprises an entry of the source address of the packet, wherein the routing table may again be updated accordingly.

The updating 150 of the routing table according to the received packet may comprise incrementing a counter indicative of the number of times packets have been received from the last hop address, having the same source address, when both the source address and the last hop address are comprised in the routing table.

As described above, the received packet comprises information relating to address of source node, last hop address, address of destination node, and the hop counter. Again reverting to the simplified and illustrative example above, assume the node in question is node C and the last hop address is that node B and the source address is that of node A. Assume further in this example that there is an entry in the routing table of the node (node C) that packets destined for node A should be forwarded to node B in order to reach node A. The node may count the number of times it receives a packet from node B (last hop address) originated at node A.

The counter may serve as a form of reliability value, wherein a relatively high number may indicate that the route may be relatively stable or trustworthy whereas a relatively low number may indicate that the route is relatively new, rarely used or otherwise more uncertain as compared to a high number. There are other ways to determine the reliability of the route. For example, the received packet may be associated with a received signal strength. The node may determine that the received signal strength must at least equal a predetermined threshold value in order to use the information comprised in the packet for building routes, e.g. updating the routing table.

The updating 150 of the routing table according to the received packet may comprise creating an entry in the routing table for the source node.

In case that there are no information in the routing table about the source node and the last hop, the node may create such an entry of the routing table. As described above, the received packet comprises address of source node, also referred to as source address, and the hop counter. Irrespective of whether the destination address (i.e. address of destination node) is comprised in the routing table or not, the node may check the routing table for the source address of the received packet. If there is no entry in the routing table for the source node having next hop corresponding to the last hop address of the received packet, the node may create an entry for the source node, wherein the entry may comprise information of how to reach the source node and the number of hop it will take to reach the source node by using the last hop address and the hop counter.

Again reverting to the non-limiting and illustrative example above, assume the node in question is C. Node C receives the packet destined for node G. The packet receives last hop address, i.e. address of node B, source address being node A and the hop counter being one. The node (i.e. node C in this example) may then create an entry in its routing table of how to reach node A, namely by node B and node A will be reached by one intermediate node since the hop counter is one. Assuming instead that in this example, the node in question is node F. The source address is still address of node A, the last hop address is that of node E and the hop counter is four (node B, node C, node D and node E). Node F may then create an entry in its routing table for node A, wherein if node F receives a packet destined for node A, node F may reach node A by forwarding the packet to node E and the packet will reach node A in four hops, i.e. four intermediate nodes.

Figure 1C:
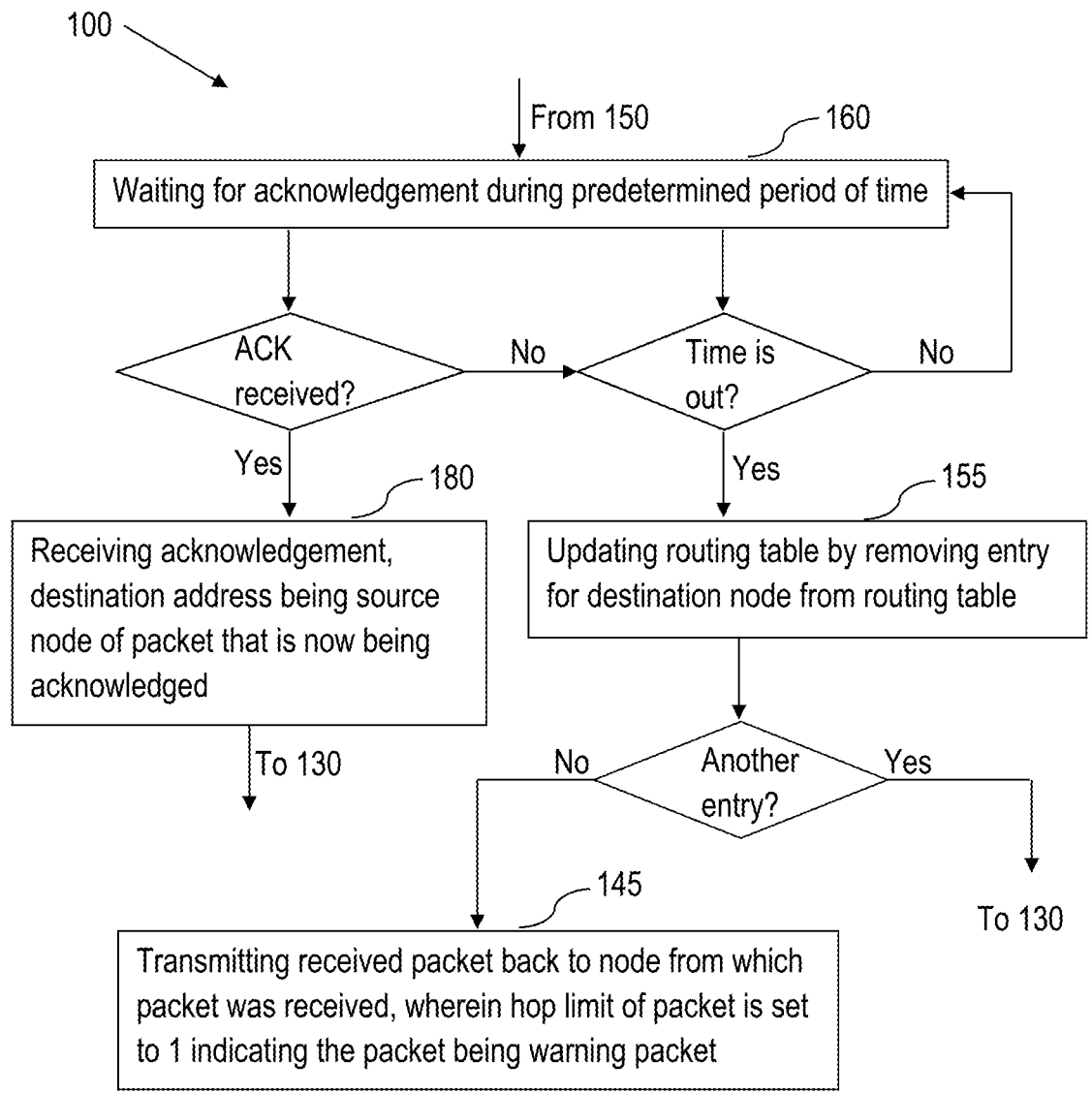
FIG. 1c is a flowchart of a method performed by a node operable in a mesh communication network for routing a received packet towards a destination, according to still an exemplifying embodiment.

The method may further comprise, as illustrated in FIG. 1c, waiting 160 for an acknowledgement for a predetermined period of time, wherein when no acknowledgement is received during the predetermined period of time, the method comprises updating 155 the routing table by removing the entry for the destination node and next hop address from which the acknowledgement was not received from the routing table.

Different things may happen as a response to the node forwarding the packet. Irrespective whether the node forwards the packet according to the routing table or by flooding, the packet may not arrive at its destination for different reasons. Once the node has forwarded the packet according to the routing table, the node waits for an acknowledgement, ACK, for the predetermined period of time. The predetermined period of time should be set long enough so that an ACK is likely to be received before expiration of the predetermined period of time. The length of the predetermined period of time is out of the scope of this disclosure and is an implementation aspect. It may be that two different predetermined periods of time are implemented, one for relatively low traffic loads and one for relatively high traffic loads. There may further be different predetermined periods of time depending on whether the packet was forwarded according to the routing table or was flooded.

However, in case the node does not receive an ACK within the predetermined period of time, the node may deduce that the route according to the routing table as become invalid and should henceforth not be used anymore. The node may then update the routing table by removing the entry for the destination node and next hop address from the routing table.

Once again, reverting to the non-limiting exemplifying example above, assume the node in question is node C. Node C has received a packet destined for node G and forwarded the packet to node D according to the routing table. The node thus waits for a hop-to-hop ACK to be received from node G via node D. If node C does not receive such an ACK within the predetermined period of time, node C may deduce that it is no longer possible to reach node G via node D and may hence delete the entry of the routing table for node G being reachable by means of node D. The reason may be for example that node E or node F has left the mesh communication network.

It is pointed out that there may be more than one entry for a destination address, however the next hop address, i.e. the node to forward the received packet to in order to reach the destination node, may be different and so may the hop counter in order to reach the destination address.

If another entry for the destination address exists in the routing table, the method may comprise forwarding 130 the received packet according to the routing table, or broadcasting 145 the received packet with the hop limit of the packet is set to 1 indicating the packet being a warning packet, if there are no more entries in the routing table for the destination node.

In the case that the node does not receive an ACK for the packet that the node forwarded towards the destination address according to the routing table, there are different actions that the node may take. As stated above, there may be more than one entry for the destination address. Generally, the node may first try the entry having the lowest number of hops, i.e. intermediate nodes, for reaching the destination address. If the node does not receive the ACK, the node may deduce that the destination node may not be reached according to that entry of the routing table. The node may thus remove that entry from the routing table as described above and try another entry of the routing table for the destination address. In a non-limiting and illustrative example, assume the node has three entries for destination node X, wherein node X can be reached via node 1 and two intermediate nodes, via node 2 and four intermediate nodes and via node 3 and five intermediate nodes. The node receiving the packet may first try using the entry in the routing table having the lowest number of intermediate nodes, i.e. node 1 in this example. If no ACK is received, the node may delete the entry for the destination address via node 1. The node may try with the second entry of the routing table, i.e. node 2 in this example. Depending on implementation, if the node does not receive an ACK for the second try, it may try the third entry of the routing table for the destination node, or the node may take other action(s) as described below.

If there are no more entries in the routing table for the destination node, or possibly if the maximum allowable number of entries has been tried, the node may broadcast 145 the received packet with the hop limit of the packet is set to 1 indicating the packet being a warning packet. The hop limit of the packet being set to 1 indicates that the packet is a warning packet and that the nodes receiving the warning packet, i.e. neighbouring nodes, should not further broadcast or forward the packet. In this manner, the node informs its neighbouring nodes, i.e. the nodes within single-hop communication range the node in question performing the method, that the node cannot reach the destination address.

Figure 1D:
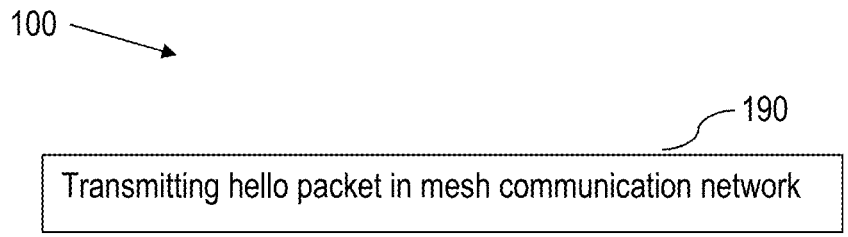
FIG. 1d is a flowchart of a method performed by a node operable in a mesh communication network for routing a received packet towards a destination, according to a further exemplifying embodiment.
Figure 1E:
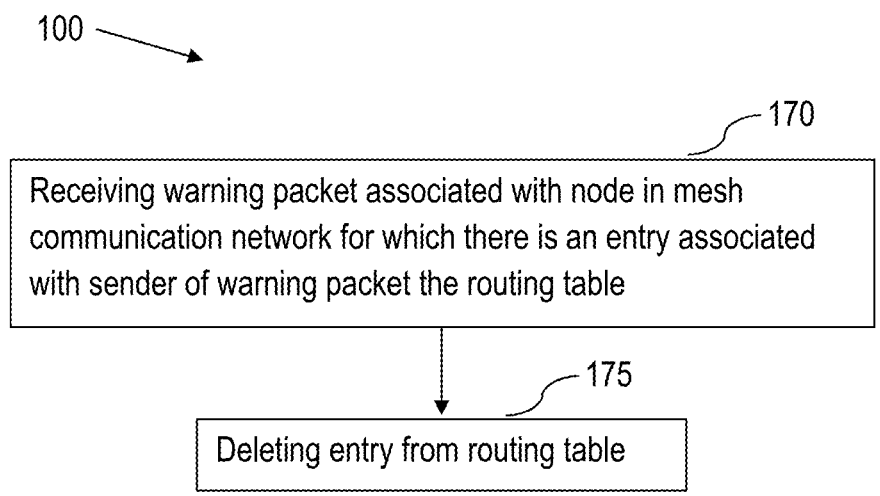
FIG. 1e is a flowchart of a method performed by a node operable in a mesh communication network for routing a received packet towards a destination, according to yet a further exemplifying embodiment.

The method may further comprise, as illustrated in FIG. 1e, receiving 170 a warning packet associated with a node in the mesh communication network for which there is an entry associated with the sender of the warning packet in the routing table, and deleting 175 the entry from the routing table.

The warning packet is an indication that the destination node cannot be reached by means of the next hop address of the entry in the routing table for the destination node. The warning packet comprises the address of the source node which cannot be reached and the address of the node sending the warning packet. The node may thus check its routing table and if there is an entry stating that the destination node may be reached via the node that sent the warning message, the node may delete that entry.

Once again, reverting to the non-limiting and illustrative example, assuming node C is the node in question. Assume that the node (node C) previously has forwarded a packet destined for node G via node D according to an entry of its routing table. Node C then receives a warning packet from node D, the warning packet comprising the destination address of node G. The node (node C) may then delete the entry stating that node G may be reached through, or via, node D.

If the node previously has forwarded a packet to the sender of the warning packet and if another entry for the destination address exists in the routing table, the method may comprise forwarding 130 the received packet according to the routing table, or broadcasting 145 the received packet with the hop limit of the packet is set to 1 indicating the packet being a warning packet, if there are no more entries in the routing table for the destination node.

When there is another entry for the destination address in the routing table, it means that there may still be a way for the node to forward the packet so that it may reach the destination node. Generally, the node first selects the entry for the destination node having the lowest amount of hops. If that fails for any reason, the node may try another entry in the routing table for the destination node.

However, if there are no more entries for the destination address in the routing table, it means that the node does not know how to route the packet in order for it to reach the destination address. The node may assume that one or more nodes are no longer available to reach the destination node, or perhaps the destination node has left the mesh communication network. The network node cannot know the reason why the delivery of the packet failed but in order to inform other nodes in its vicinity, i.e. neighbouring nodes that the node can reach directly, the node broadcast the received packet with the hop limit of the packet is set to 1 indicating the packet being a warning packet. In this manner, the neighbouring nodes are informed that the packet cannot be delivered to the destination node via the given node.

The method may further comprise receiving 180 an acknowledgement during the predetermined period of time, the destination node for the acknowledgement being the source node of the packet that is now being acknowledged, and forwarding 130 the received packet according to the routing table.

There may be two different kinds of acknowledgements, ACKs, hop-by-hop and end-to-end. A hop-by-hop ACK is returned by next hop to the previous hop upon successful reception of a routed packet. An end-to-end ACK is sent from the destination node of a packet that is being acknowledged to its source node upon successful reception. End-to-end ACKs may carry data that the destination node has to send to the source node.

Reverting again to the non-limiting and illustrative example, the method is performed by each node in the mesh network. For node C, when node C received the "first" packet that is now being acknowledged, the node updated its routing table so that it now know that any packet destined for, i.e. addressed to, node A may be delivered to node A by forwarding it to node B, wherein the distance, i.e. the number of intermediate nodes, is one (namely node B). Consequently, when node C receives the ACK, the ACK is received from node D as last hop address and the destination address of the ACK is node A. Node C thus looks at its routing table and forwards the ACK accordingly, i.e. to node B.

The method may further comprise updating 150 the routing table according to the received packet, the received packet being the acknowledgement.

The received packet being acknowledgement is transmitted from the previous destination node, now being the source node for the ACK to previous source node, now being the destination node. From the non-limiting and illustrative example, the "first packet" had node A as source address and node G as destination address. For the ACK, node G is source address and node A is destination address. When the node C received the first packet, it updated its routing table as described above. Node C also forwarded the packet either by unicast or broadcast depending on whether there was an entry in the routing table for node G or not.

When node C receives the ACK, the ACK has node D as last hop address, node G as source address and the hop counter is three, i.e. distance or number of intermediate nodes between node C and the source address, node G. If no entry is present in the routing table for node G being reachable via node D, node C may create such an entry stating that any packet destined for, i.e. addressed to, node G may be forwarded to node D, wherein the distance to node G from node C, via node D is three (i.e. node D, node E and node F).

The updating 150 of the routing table according to the received packet, the received packet being the acknowledgement, may comprise incrementing a counter indicative of the number of times packets have been received from the last hop address, having the same source address, when both the source address and the last hop address are comprised in the routing table.

As described above, the received packet generally causes the routing table of the node to somehow be updated. As for the case when the "first" packet was received, which is now being acknowledged, the node may update the routing table in accordance with the received ACK.

The node may not distinguish between a regular packet and an ACK with respect to the updating of the routing table. By using every received packet for updating the routing table, the routing table is kept as much up to date as possible and the node may deduce which routes are relatively more stable than others and which nodes are relatively new as compared to others.

The updating 150 of the routing table according to the received packet, the received packet being the acknowledgement, may comprise creating an entry in the routing table for the source node.

By updating the routing table, it is kept as much up to date as possible. It may be that when the node received the first packet which is now being acknowledged, there was no entry in its routing table for the destination address of the received packet and the node thus flooded or broadcasted the received packet.

As the ACK is received, it is received from the last hop address and the ACK comprises information about the source address for which there was no entry in the routing table of the node. By receiving the ACK, the node is provided with information on how to reach the node that sent the ACK, namely by means of the last hop address of the packet. The node is also informed about the distance to the source node via the last hop address by the hop counter indicating the number of intermediate nodes.

The method may further comprise, as illustrated in FIG. 1d, broadcasting 190 a hello packet in the mesh communication network.

The hello packet may be sent at regular or irregular time intervals, they may be triggered by one or more events etc. The hello packet enables optimising different routes and discovering new nodes that have joined the mesh communication network. The node may send a hello packet to a destination address e.g. after a time interval has passed since a previous hello packet was transmitted associated with the destination address and/or a received packet addressed to the destination address was flooded, i.e. broadcasting in the mesh communication network.

The hello packet is a packet that may carry data and has the forced flooding indication, but unlike warning packets it does not cause records in tables to be deleted. The hello packet is used to let newly joined nodes participate in packet forwarding. Nodes may have independent HELLO_INT timers per each destination they communicate with. Expiration of HELLO_INT timer itself may not trigger a hello packet, a node may need to have data to send with the hello packet. The HELLO_INT timer(s) correspond(s) to the time interval described just above.

The hello packet may be broadcasted when a predetermined hello packet timer expires.

There may be a timer, e.g. the HELLO_INT timer described above, that determines when the node shall send the hello packet.

One reason for having to wait for the timer to expire before sending the hello packet is that otherwise there may be a lot of unnecessary hello packets being transmitted by nodes in the mesh communication network, thereby wasting resources and possibly even overloading the mesh communication network.

The method may further comprise receiving 191 a hello packet and broadcasting 192 the received hello packet.

As the mesh communication network may comprise a plurality of nodes, wherein the interconnection of these nodes creates various different routes between them. By the transmission of the hello packet, different routes may be discovered, wherein a new shorter route between may be discovered as a better option to an old longer route.

Upon reception of the hello packet or a warning packet, the destination may, or should, send back an end-to-end ACK so that the route towards it can be found/fixed. The source address node may also require as an option to send end-to-end ACK in response to flooding packets (i.e. packets that have been broadcasted from one or more nodes in the mesh communication network) or routed packets (i.e. packets that have been transmitted from the source node to the destination node by means of forwarding from node to node).

The method may further comprise updating 192 the routing table according to the received hello packet.

Different information may be obtained from the hello packet, and as all the other described packets herein, the hello packet may comprise information of a source address, a destination address, a last hop address and a hop counter.

Having such information, any node receiving such a hello packet may update its routing table in the same manner has have been described above for regular packets and ACKs.

Figure 2B:
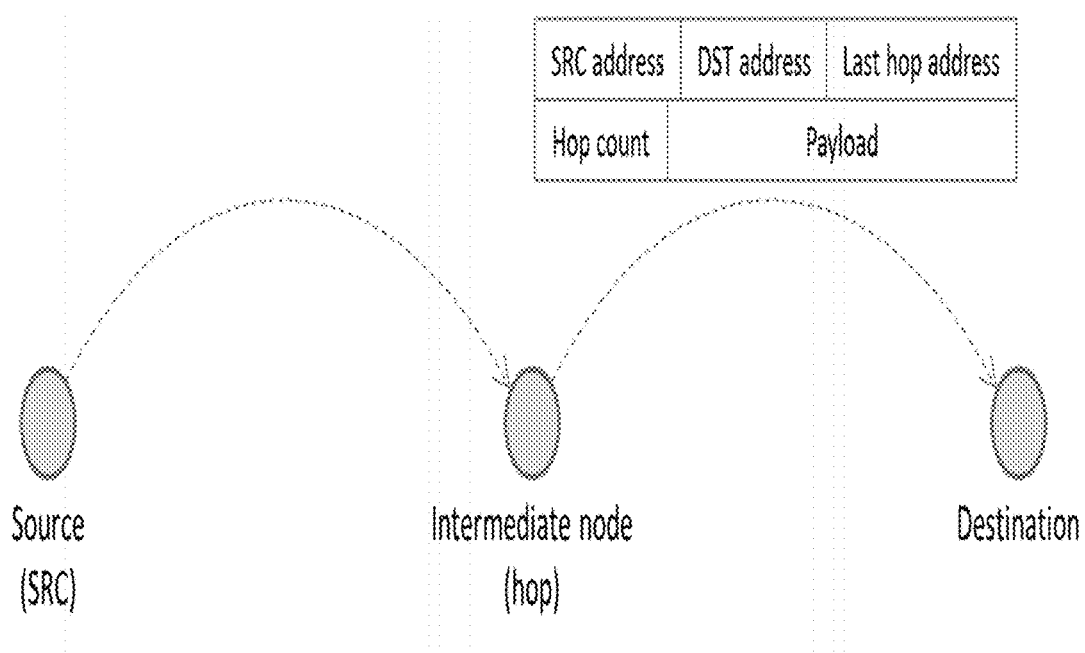
FIG. 2b is an illustration of an example of a simplified mesh communication network and contents of a packet sent between a source node and a destination node.

In this disclosure, several types of packets have been mentioned and/or described. For example a flooded packet which is a packet that is broadcasted by a node. A routed packet is a packet that is forwarded by a node in accordance with the routing table of the node. A warning packet, a hello packet and two types of acknowledgements have also been described. All packet may comprise information pertaining to source address, destination address, last hop address and hop counter. The only packet that generally has a forced flooding indication is the hello packet and all packets except hop-by-hop ACKS may carry data, but end-to-end packets do not necessarily have to carry data. See also table 1 of FIG. 2a.

It is assumed in this disclosure that in a mesh network, when a node receives a packet it can read the source address of the packet, the destination address and the address of the node from which it was received (last hop address). The source and destination addresses can be either physical addresses or high-level addresses. The last hop address is generally the physical address of the node.

Packets have a field that counts how many hops (intermediate nodes) it had on its way. It can be both incremental (starting from zero) and decremental (starting from a predefined maximum value) field. Usually this field is used to limit flooding of packets. It is also assumed that in flooding mode, nodes forward each packet only once. See also FIG. 2b. It is also assumed that the network is reciprocal, i.e., that a route suitable for sending packets from node A to node B is also suitable for sending packets from node B to node A.

Figure 2C:
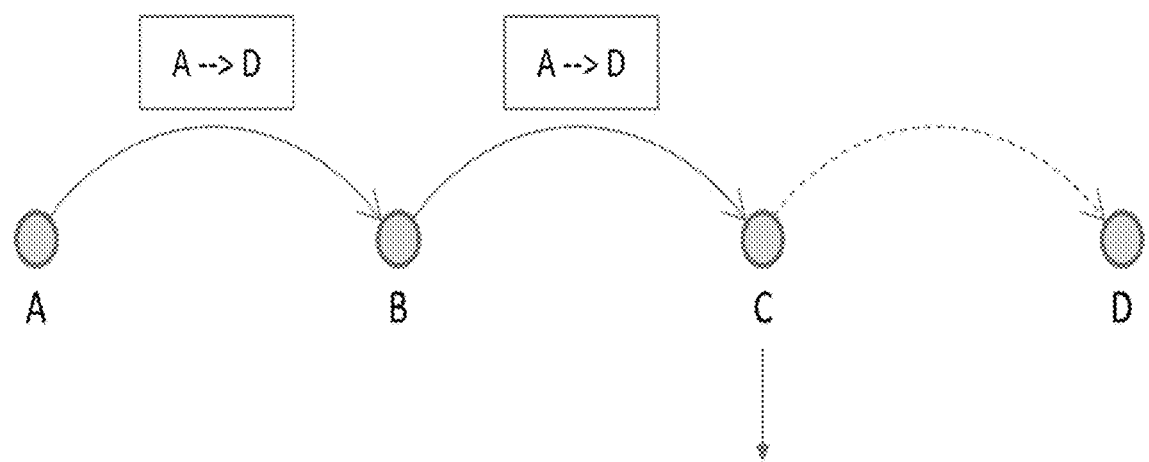
FIG. 2c is an illustration of an example of a simplified mesh communication network and how a node C may update a routing table based on information comprised in a received packet.

For each received flooded packet (FP), the node may add a record to its routing table. The routing table may have four columns: destination, next hop, distance and counter, see FIG. 2c.

From each received packet the node gets information on how it can reach the source of the packet. The routing table is filled based on the assumption that the network is reciprocal, i.e. a packet received for a source node provides information to the entry of the routing table where the packet source is the destination.

The node adds source address into the destination column, last hop address into next hop and number of hops into the distance column. Therefore, there appears an entry, also referred to as a record, in the routing table that says that the node can reach that destination (the source of the packet) that is that many hops away via that next hop. There should not be duplicate records (same destination, next hop and distance) in the routing table. The counter field shows how many packets have indicated the same route (same destination, next hop and distance) and is being incremented with new packets.

When a node receives a packet that has to be forwarded further, it checks its routing table for an entry for the destination address of the packet. If there are no records for that destination, it broadcasts the packet (floods it). If there are records, it picks a record with the shortest distance (measured in hops). Then the node unicasts the packet to the node with the next hop address from the table (routed packet, RP). In other words, the node forwards the packet in accordance with the routing table.

The unicast procedure may be performed in different ways depending on the communication technology. It may be done on low level, which means the packet will be received only by the addressee, or it may be done on high level: the packet will be received by all the neighbours, but only the specified one will process it.

The problem of wireless mesh networks is that the nodes can move, propagation conditions may change, nodes may appear and disappear. Therefore, previously discovered routes may not be valid or optimal any longer. If a packet was unicasted to the next hop, that does not exist anymore, it will be lost. In order to handle such cases, packets in the mesh networks should be acknowledged. The acknowledgement mechanism in itself is out of scope of this disclosure, however some insights are provided.

If a hop-by-hop acknowledgement was not received from the next hop node, the corresponding entry/record from the routing table should be removed; the node should pick another entry/record from its routing table with shortest distance and unicast to that next hop. After all possible (or a predetermined number of maximum attempt) next hops were tried and failed to provide ACK, the node should broadcast the packet back to the previous hop with hop limit 1 (warning packet, WP) so that it is received only by neighbours. When a node receives a warning packet it also deletes an entry/record from routing table with both: a) destination address equal to DST address in the warning packet; and b) next hop address equal to the node address from which the warning packet was received. Therefore, failed routes to the destination via that hop will be removed from the network. If the node has forwarded this packet before (the node belongs to the current route) then it should try another route if available in its routing table. Otherwise send WP again and so on. Whether the node has forwarded the packet before or not can be checked using cache of the packets.

If a warning packet reaches the source of the packet (meaning that no nodes along the original route were able to deliver the packet), source can try as the last means send a hello packet (see below) which will flood through the entire network.

Since the nodes may have small amount of memory available for the routing table, the number of records kept for each destination may be limited, for example, to two records. If it is limited to one record, the node will flood the packet as soon as the only possible next hop fails to respond with an ACK. If the limit is reached but there is a new route found, then the record with the longest route should be replaced with the new record provided that the new route is shorter that the existing longest.

Figure 3A:
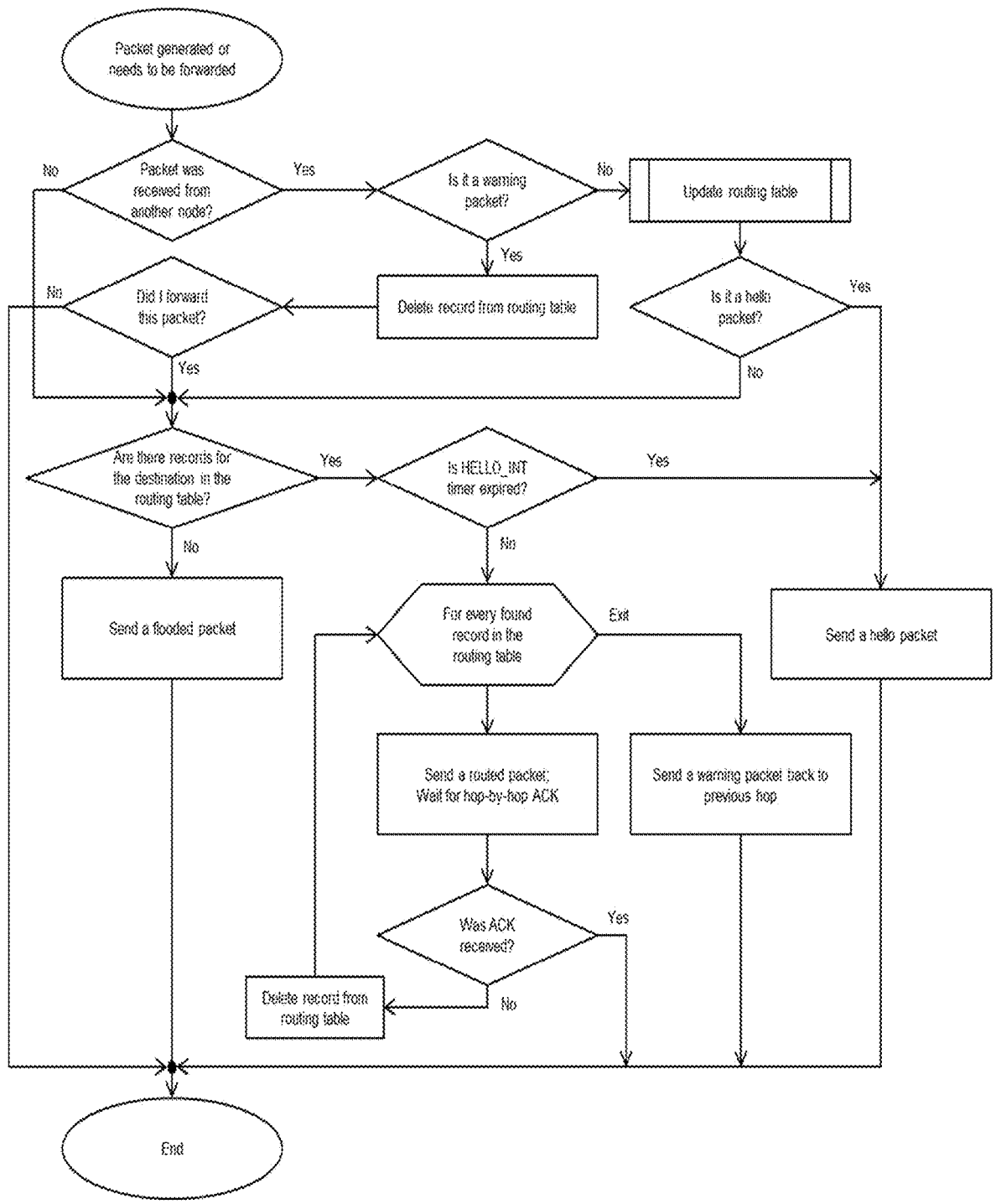
FIG. 3a is a flowchart of a method performed by a node operable in a mesh communication network for routing a received packet towards a destination, according to an exemplifying embodiment.
Figure 3B:
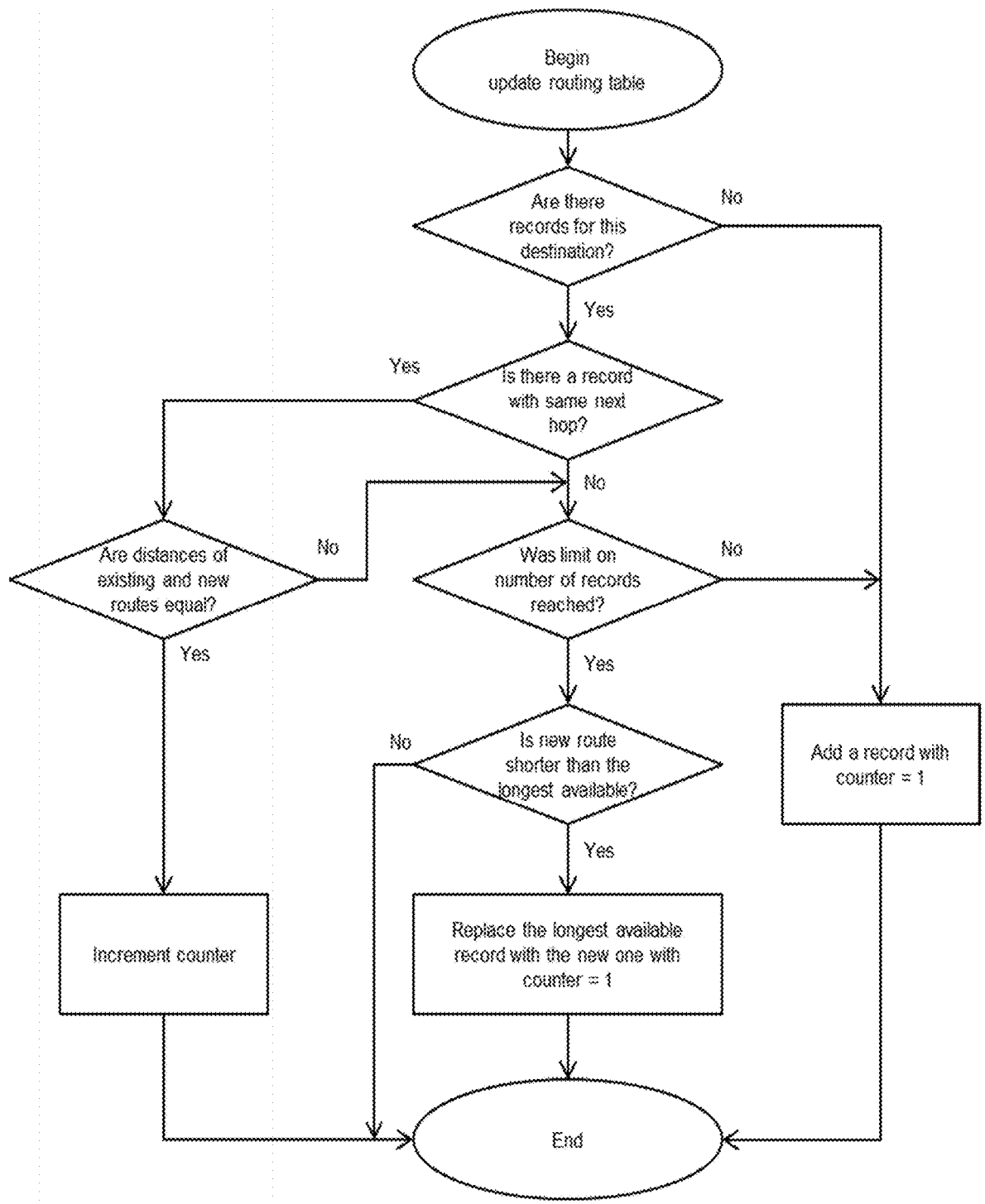
FIG. 3b is a flowchart of a method performed by a node operable in a mesh communication network for routing a received packet towards a destination, according to an exemplifying embodiment.

FIGS. 3a and 3b are flowcharts of a couple of exemplifying embodiments of a method performed by a node for routing a received packet towards a destination.

Figures 3C, 3D:
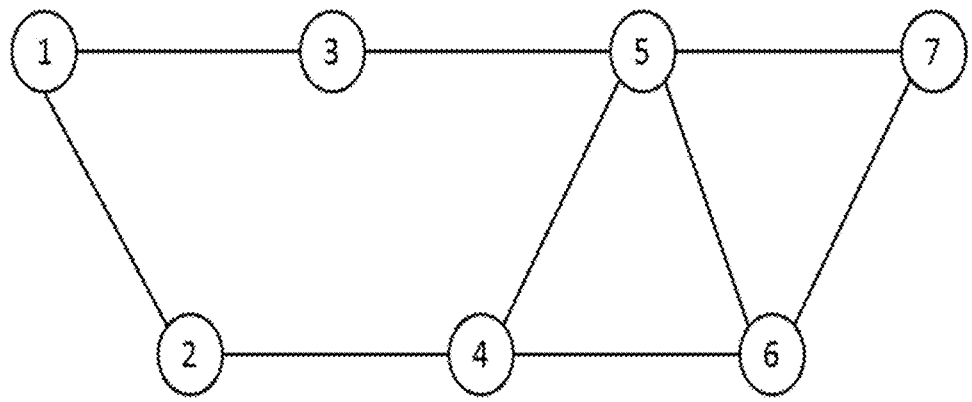
FIG. 3c is an illustration of an example of a mesh communication network.
FIG. 3d is an illustrative example of a possible routing table having two entries per destination address.

FIG. 3c is an exemplifying example of a mesh communication network having seven nodes. The lines between them represent connectivity between the nodes. Routing tables are empty at the beginning. If node 2 sends a packet to node 6, it will be flooded through all the nodes. After it happened, the routing tables will contain records. In the case that there may be two entries/records per destination, the routing table may look like the one in FIG. 3d. In the case that the routing table may only comprise one entry/record per destination, the routing table may look like the one in FIG. 3e.

Now, for example, node 7 needs to send a packet to node 2. If nothing changes, in both cases the nodes will route the packet node 5, node 5 to node 4, node 4 to node 2.

Figures 3E, 3F:
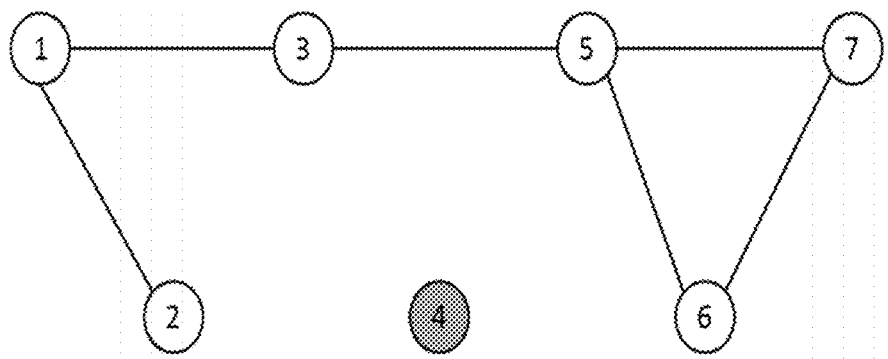
FIG. 3e is an illustrative example of a possible routing table having one entry per destination address.
FIG. 3f is another illustration of an example of a mesh communication network.

However, now assume that node 4 leaves the network or is turned off as illustrated in FIG. 3f. In the case when each node has a respective routing table comprising two entries/records per destination, then node 7 will send packet to node 5, node 5 will try to send it to node 4 but will get no ACK. Then node 5 will send packet to node 3, node 3 to node 1, node 1 to node 2. In the case when each node has a respective routing table comprising only one entry/record per destination, then node 7 will send packet to node 5, node 5 will try to send it to node 4 but will get no ACK. Then node 5 will broadcast the packet with forced flooding indication as a warning packet. The packet will be received by nodes 3, 6 and 7 and will be eventually delivered to node 2 via node 1.

Thus, using information available from packets sent over the flooding mesh network enables a smoothly move to routed mesh network operation without additional overhead of route discovery and maintenance.

Embodiments herein also relate to a node operable in a mesh communication network for routing a received packet towards a destination. Exemplifying embodiments will now be described with reference to FIGS. 4 and 5.

Figure 4:
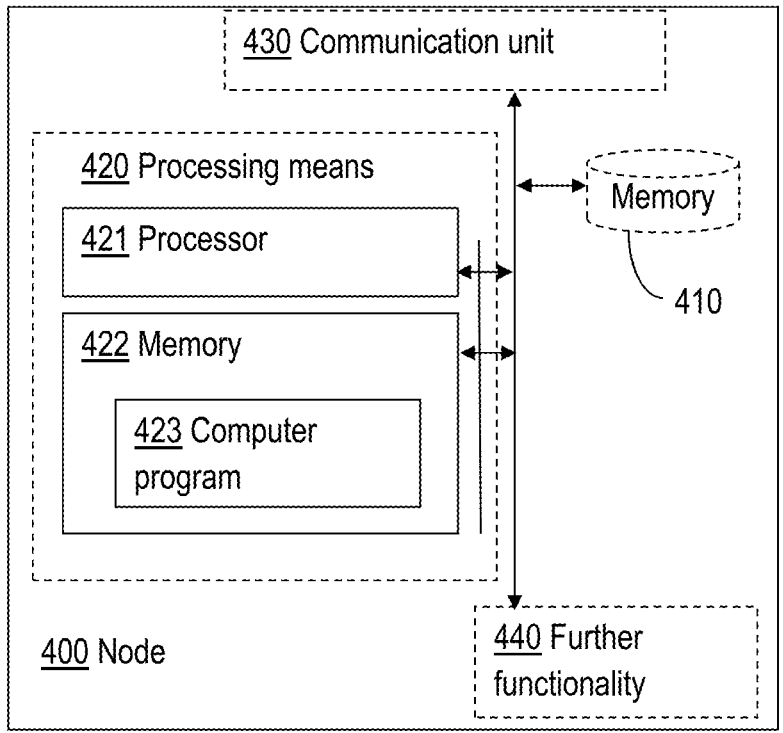
FIG. 4 is a block diagram of a node operable in a mesh communication network for routing a received packet towards a destination, according to an exemplifying embodiment.
Figure 5:
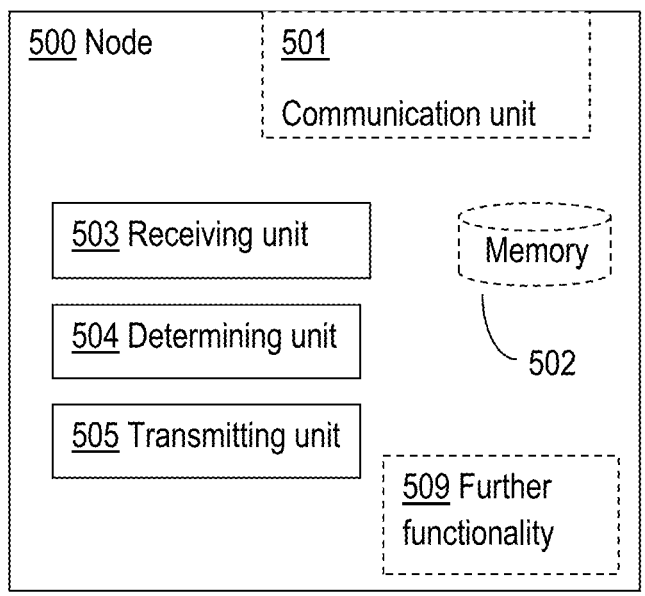
FIG. 5 is a block diagram of a node operable in a mesh communication network for routing a received packet towards a destination, according to another exemplifying embodiment.

FIG. 4 and FIG. 5 are block diagrams of two different exemplifying embodiments of such a node. FIGS. 4 and 5 illustrate the node 400, 500 being configured for receiving a packet addressed to a destination node in the mesh network, the packet comprising information related to address of source node, last hop address, address of destination node, and a hop counter; and determining whether the destination address is comprised in a routing table of the node in the mesh communication network. The node 400, 500 is further configured for, when destination address is comprised in a routing table, forwarding the received packet according to the routing table; or when destination address is not comprised in a routing table, flooding the received packet by broadcasting it in the mesh communication network.

The node 400, 500 may be implemented or realised in different ways. An exemplifying implementation is illustrated in FIG. 4. FIG. 4 illustrates the node 400 comprising a processor 421 and memory 422, the memory comprising instructions, e.g. by means of a computer program 423, which when executed by the processor 421 causes the node 400 to receive a packet addressed to a destination node in the mesh network, the packet comprising information related to address of source node, last hop address, address of destination node, and a hop counter; and to determine whether the destination address is comprised in a routing table of the node in the mesh communication network. The memory may further comprise instructions, e.g. by means of a computer program 423, which when executed by the processor 421 causes the node 400 to, when destination address is comprised in a routing table, forward the received packet according to the routing table; or when destination address is not comprised in a routing table, flood the received packet by broadcasting it in the mesh communication network.

FIG. 4 also illustrates the node 400 comprising a memory 410. It shall be pointed out that FIG. 4 is merely an exemplifying illustration and memory 410 may optionally, be a part of the memory 422 or be a further memory of the node 400 operable in a mesh communication network. The memory may for example comprise information relating to the node 400, to statistics of operation of the node 400, just to give a couple of illustrating examples. FIG. 4 further illustrates the node 400 comprising processing means 420, which comprises the memory 422 and the processor 421. Still further, FIG. 4 illustrates the node 400 comprising a communication unit 430. The communication unit 430 may comprise an interface through which the node 400 communicates with other nodes, servers, wireless devices or entities of the mesh communication network. FIG. 4 also illustrates the node 400 comprising further functionality 440. The further functionality 440 may comprise hardware of software necessary for the node4 to perform different tasks that are not disclosed herein.

An alternative exemplifying implementation of the node 400, 500 is illustrated in FIG. 5. FIG. 5 illustrates the node 500 comprising a receiving unit 503 for receiving a packet addressed to a destination node in the mesh network, the packet comprising information related to address of source node, last hop address, address of destination node, and a hop counter; and a determining unit 504 for determining whether the destination address is comprised in a routing table of the node in the mesh communication network. FIG. 5 also illustrates the node 500 comprising an transmitting unit 505 for when destination address is comprised in a routing table, forwarding the received packet according to the routing table; or when destination address is not comprised in a routing table, flooding the received packet by broadcasting it in the mesh communication network.

In FIG. 5, the node 500 operable in a mesh communication network is also illustrated comprising a communication unit 501. Through this unit, the node 500 is adapted to communicate with other nodes and/or entities in the mesh communication network. The communication unit 501 may comprise more than one receiving arrangement. For example, the communication unit may be connected to both a wire and an antenna, by means of which the node 500 is enabled to communicate with other nodes and/or entities in the mesh communication network. Similarly, the communication unit 501 may comprise more than one transmitting arrangement, which in turn are connected to both a wire and an antenna, by means of which the node 500 s enabled to communicate with other nodes and/or entities in the mesh communication network. The node 500 further comprises a memory 502 for storing data. Further, the node 500 may comprise a control or processing unit (not shown) which in turn is connected to the different units 503-505. It shall be pointed out that this is merely an illustrative example and the node 500 may comprise more, less or other units or modules which execute the functions of the node 500 in the same manner as the units illustrated in FIG. 5.

It should be noted that FIG. 5 merely illustrates various functional units in the node 500 in a logical sense. The functions in practice may be implemented using any suitable software and hardware means/circuits etc. Thus, the embodiments are generally not limited to the shown structures of the node 500 and the functional units. Hence, the previously described exemplary embodiments may be realised in many ways. For example, one embodiment includes a computer-readable medium having instructions stored thereon that are executable by the control or processing unit for executing the method steps in the node 500. The instructions executable by the computing system and stored on the computer-readable medium perform the method steps of the node 500 as set forth in the claims.

The node has the same possible advantages as the method performed by the node. One possible advantage is that the node is not required to perform any route discovery or maintenance process. Consequently, overhead caused by any route discovery or maintenance may be avoided. Another possible advantage is that power consumption may be reduced due to among other things reduced overhead. Further unnecessary retransmissions may be avoided and hence may also interference due to such retransmissions be reduced. Yet a further advantage is that low and high intensity traffic flows may be adaptively managed within the mesh network. Low intensity flows may be handled using flooding and while high intensity traffic flows may initially start on flooding mode and switch to routing after an initialisation period.

According to an embodiment, the node is further configured for updating the routing table according to the received packet.

According to yet an embodiment, the node is configured for updating the routing table according to the received packet by incrementing a counter indicative of the number of times packets have been received from the last hop address, having the same source address, when both the source address and the last hop address are comprised in the routing table.

According to still an embodiment, the node is configured for updating the routing table according to the received packet by creating an entry in the routing table for the source node.

According to another embodiment, the created entry comprises the address of the source node, the next hop for the source node is set to the last hop address and a distance to the source node is set to the hop counter of the received packet.

According to a further embodiment, the node further being configured for waiting for an acknowledgement for a predetermined period of time, wherein when no acknowledgement is received during the predetermined period of time, the node 400,500 is configured for updating the routing table by removing the entry for the destination node and next hop address from which the acknowledgement was not received from the routing table.

According to an embodiment, if another entry for the destination address exists in the routing table, the node 400, 500 is configured for forwarding the received packet according to the routing table, or broadcasting the received packet with the hop limit of the packet is set to 1 indicating the packet being a warning packet, if there are no more entries in the routing table for the destination node.

According to yet an embodiment, the node is further configured for receiving a warning packet associated with a node in the mesh communication network for which there is an entry associated with the sender of the warning packet in the routing table, and deleting the entry from the routing table.

According to still an embodiment, if the node previously has forwarded a packet to the sender of the warning packet and if another entry for the destination address exists in the routing table, the node is configured for forwarding the received packet according to the routing table, or broadcasting the received packet with the hop limit of the packet is set to 1 indicating the packet being a warning packet, if there are no more entries in the routing table for the destination node.

According to another embodiment, the node is further configured for receiving an acknowledgement during the predetermined period of time, the destination node for the acknowledgement being the source node of the packet that is now being acknowledged, and forwarding the received packet according to the routing table.

According to a further embodiment, the node is further configured for updating the routing table according to the received packet, the received packet being the acknowledgement.

According to an embodiment, the node is configured for updating the routing table according to the received packet, the received packet being the acknowledgement, by incrementing a counter indicative of the number of times packets have been received from the last hop address, having the same source address, when both the source address and the last hop address are comprised in the routing table.

According to yet an embodiment, the node is configured for updating the routing table according to the received packet, the received packet being the acknowledgement, by creating an entry in the routing table for the source node.

According to still an embodiment, the node is further configured for broadcasting a hello packet in the mesh communication network.

According to another embodiment, the hello packet is broadcasted when a predetermined hello packet timer expires.

According to another embodiment, the node is further being configured for receiving a hello packet and broadcasting (192) the received hello packet.

According to an embodiment, the node is further being configured for updating the routing table according to the received hello packet.

Figure 6:
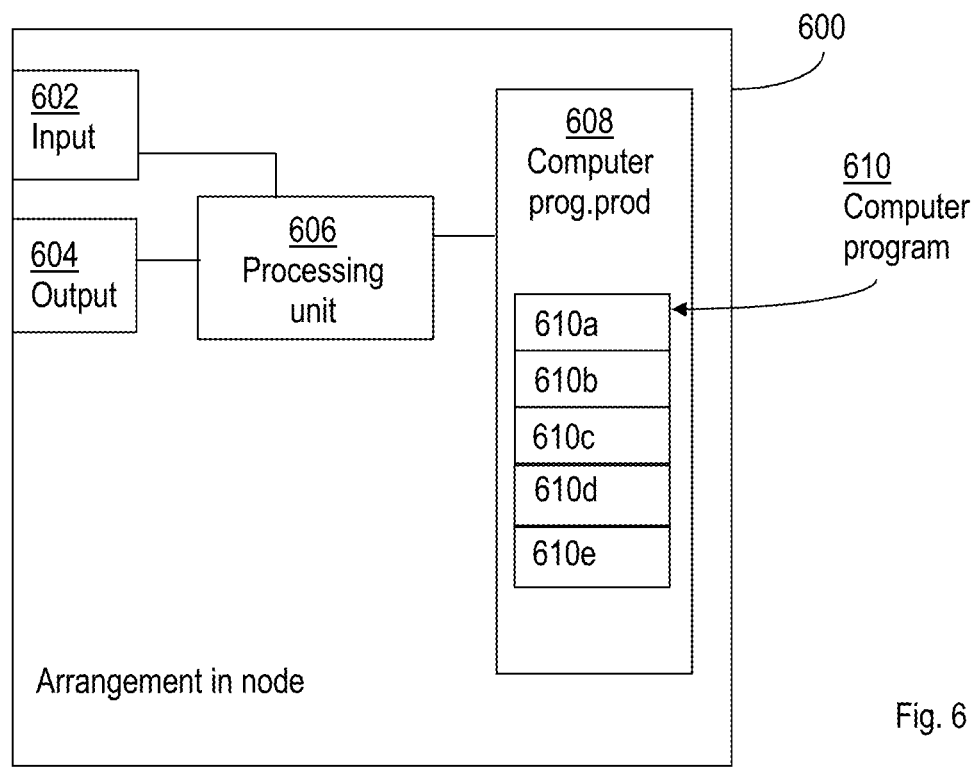
FIG. 6 is a block diagram of an arrangement in a node operable in a mesh communication network for routing a received packet towards a destination, according to an exemplifying embodiment.

FIG. 6 schematically shows an embodiment of an arrangement 600 in a node 500 operable in a first communication network. Comprised in the arrangement 600 in the node 500 are here a processing unit 606, e.g. with a DSP. The processing unit 606 may be a single unit or a plurality of units to perform different actions of procedures described herein. The arrangement 600 in the node 500 may also comprise an input unit 602 for receiving signals from other entities, and an output unit 604 for providing signal(s) to other entities. The input unit and the output unit may be arranged as an integrated entity or as illustrated in the example of FIG. 5, as one or more interfaces 501.

Furthermore, the arrangement 600 in the node 500 comprises at least one computer program product 608 in the form of a non-volatile memory, e.g. an EEPROM, a flash memory and a hard drive. The computer program product 608 comprises a computer program 610, which comprises code means, which when executed in the processing unit 606 in the arrangement 600 in the node 500 in the mesh communication network causes the node 500 to perform the actions e.g. of the procedure described earlier in conjunction with FIGS. 1a-1e.

The computer program 610 may be configured as a computer program code structured in computer program modules 610a-610e. Hence, in an exemplifying embodiment, the code means in the computer program of the arrangement 600 in the node 500 comprises a receiving unit, or module, for receiving a packet addressed to a destination node in the mesh network, the packet comprising information related to address of source node, last hop address, address of destination node, and a hop counter, and a determining unit, or module, for determining whether the destination address is comprised in a routing table of the node in the mesh communication network. The computer program further comprises a transmitting unit, or module, for, when destination address is comprised in a routing table, forwarding the received packet according to the routing table; or when destination address is not comprised in a routing table, flooding the received packet by broadcasting it in the mesh communication network.

The computer program modules could essentially perform the actions of the flow illustrated in FIGS. 1a-1e, to emulate the node 500 operable in the communication network. In other words, when the different computer program modules are executed in the processing unit 606, they may correspond to the units 503-504 of FIG. 5.

Although the code means in the respective embodiments disclosed above in conjunction with FIG. 5 is implemented as computer program modules which when executed in the processing unit causes the node to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the node.

It is to be understood that the choice of interacting units, as well as the naming of the units within this disclosure are only for exemplifying purpose, and nodes suitable to execute any of the embodiments of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a node in a mesh communication network for routing a received packet towards a destination, the method comprising:
   receiving a packet addressed to a destination node in the mesh network, the packet comprising information related to address of source node, last hop address, address of destination node, and a hop counter,
   determining whether the destination address is comprised in a routing table of the node in the mesh communication network,
   when destination address is comprised in the routing table, forwarding the received packet according to the routing table, or when destination address is not comprised in the routing table, flooding the received packet by broadcasting it in the mesh communication network, and
   updating the routing table according to the received packet, wherein the method further comprising:
   receiving a warning packet associated with a node in the mesh communication network for which there is an entry associated with the sender of the warning packet in the routing table, and deleting the entry from the routing table,
   wherein if the node previously has forwarded a packet to the sender of the warning packet and if another entry for the destination address exists in the routing table, forwarding the received packet according to the routing table, or broadcasting the received packet with the hop limit of the packet is set to 1 indicating the packet being a warning packet, if there are no more entries in the routing table for the destination node.

2. The method according to claim 1, wherein the updating of the routing table according to the received packet comprises incrementing a counter indicative of the number of times packets have been received from the last hop address, having the same source address, when both the source address and the last hop address are comprised in the routing table.

3. The method according to claim 1, wherein the updating of the routing table according to the received packet comprises creating an entry in the routing table for the source node.

4. The method according to claim 3, wherein the created entry comprises the address of the source node, the next hop for the source node is set to the last hop address and a distance to the source node is set to the hop counter of the received packet.

5. The method according to claim 1, further comprising:
   waiting for an acknowledgement for a predetermined period of time, wherein when no acknowledgement is received during the predetermined period of time, the method comprises updating the routing table by removing the entry for the destination node and next hop address from which the acknowledgement was not received from the routing table.

6. The method according to claim 5, wherein if another entry for the destination address exists in the routing table, the method comprises forwarding the received packet according to the routing table, or broadcasting the received packet with the hop limit of the packet is set to 1 indicating the packet being a warning packet, if there are no more entries in the routing table for the destination node.

7. The method according to claim 5, further comprising:
   receiving an acknowledgement during the predetermined period of time, the destination node for the acknowledgement being the source node of the packet that is now being acknowledged, and forwarding the received packet according to the routing table.

8. The method according to claim 7, further comprising:
   updating the routing table according to the received packet, the received packet being the acknowledgement.

9. A node operable in a mesh communication network for routing a received packet towards a destination, the node being configured to:
   receive a packet addressed to a destination node in the mesh network, the packet comprising information related to address of source node, last hop address, address of destination node, and a hop counter,
   determine whether the destination address is comprised in a routing table of the node in the mesh communication network,
   when destination address is comprised in the routing table, forward the received packet according to the routing table, or when destination address is not comprised in the routing table, flood the received packet by broadcasting it in the mesh communication network, and
   update the routing table according to the received packet, wherein the node is further configured to:
   receive a warning packet associated with a node in the mesh communication network for which there is an entry associated with a sender of the warning packet in the routing table, and delete the entry from the routing table, wherein if the node previously has forwarded a packet to the sender of the warning packet and if another entry for the destination address exists in the routing table, the node is configured to forward the received packet according to the routing table, or broadcast the received packet with the hop limit of the packet is set to 1 indicating the packet being a warning packet, if there are no more entries in the routing table for the destination node.

10. The node according to claim 9, being further configured to:

update the routing table according to the received packet by incrementing a counter indicative of the number of times packets have been received from the last hop address, having the same source address, when both the source address and the last hop address are comprised in the routing table.

11. The node according to claim 9, being further configured to update the routing table according to the received packet by creating an entry in the routing table for the source node.

12. The node according to claim 11, wherein the created entry comprises the address of the source node, the next hop for the source node is set to the last hop address and a distance to the source node is set to the hop counter of the received packet.

13. A method performed by a node in a mesh communication network for routing a received packet towards a destination, the method comprising:

receiving a packet addressed to a destination node in the mesh network, the packet comprising information related to address of source node, last hop address, address of destination node, and a hop counter, determining whether the destination address is comprised in a routing table of the node in the mesh communication network, forwarding the received packet based on determining whether the destination address is comprised in the routing table of the node in the mesh communication network, and updating the routing table according to the received packet, wherein the method further comprising:

receiving a warning packet associated with a node in the mesh communication network for which there is an entry associated with the sender of the warning packet in the routing table, and deleting the entry from the routing table, wherein if the node previously has forwarded a packet to the sender of the warning packet and if another entry for the destination address exists in the routing table, forwarding the received packet according to the routing table, or broadcasting the received packet with the hop limit of the packet is set to 1 indicating the packet being a warning packet, if there are no more entries in the routing table for the destination node.

14. The method of claim 13, wherein forwarding comprises forwarding the received packet according to the routing table responsive to determining that the destination address is comprised in the routing table of the node in the mesh communication network.

15. The method of claim 13, wherein forwarding comprises broadcasting the received packet in the mesh communication network responsive to determining that the destination address is not comprised in the routing table of the node in the mesh communication network.

16. The method according to claim 14, further comprising:

when no acknowledgement is received after waiting a predetermined period of time, updating the routing table by removing the entry for the destination node and next hop address from which the acknowledgement was not received from the routing table.

* * * * *